(12) United States Patent
Hanna et al.

(10) Patent No.: US 6,965,500 B1
(45) Date of Patent: Nov. 15, 2005

(54) SUSPENSION DESIGN FOR ATTENUATION OF DISK FLUTTER INDUCED TRACK MIS-REGISTRATION OF A HARD DISK DRIVE BY MANIPULATION OF LOAD BEAM PITCH ANGLE

(75) Inventors: Aaron J. Hanna, San Jose, CA (US); Lin Yang, San Jose, CA (US); Jin Hui Ou-Yang, San Jose, CA (US); Chiao-Ping R. Ku, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 598 days.

(21) Appl. No.: 10/080,786

(22) Filed: Feb. 22, 2002

(51) Int. Cl.$^7$ .............................. G11B 5/55
(52) U.S. Cl. ............... 360/245; 360/245.1; 360/245.3
(58) Field of Search .................... 360/245, 245.1, 360/245.2, 245.4, 245.5, 244.8, 244.9

(56) References Cited

U.S. PATENT DOCUMENTS

| | | | | |
|---|---|---|---|---|
| 4,954,919 A | * | 9/1990 | Yamada | 360/245 |
| 5,661,619 A | * | 8/1997 | Goss | 360/245.1 |
| 5,758,406 A | * | 6/1998 | Hunsaker et al. | 29/603.06 |
| 5,790,347 A | * | 8/1998 | Girard | 360/245 |
| 5,907,457 A | * | 5/1999 | Kudo et al. | 360/246.2 |
| 5,946,165 A | * | 8/1999 | Khan et al. | 360/245.1 |
| 6,359,758 B1 | * | 3/2002 | Boutaghou | 360/294.4 |

* cited by examiner

*Primary Examiner*—A. J. Heinz
*Assistant Examiner*—Christopher R. Magee
(74) *Attorney, Agent, or Firm*—Young Law Firm

(57) ABSTRACT

A disk drive includes a head gimbal assembly that includes structure that decreases the pitch angle of the load beam, which decreases disk flutter induced track mis-registration. According to one embodiment, the disk drive includes a body portion including a bore defining a pivot axis; an actuator arm cantilevered from the body portion and a head gimbal assembly (HGA) supported at the actuator arm. The HGA includes a load beam having a first end and a second end, the first end being attached to the actuator arm, the load beam defining a load beam feature near the second end, at least a portion of the load beam feature defining an extension that is parallel to the pivot axis and that has a rectangular cross-section having a length to width aspect ratio that is greater than 1. A slider is coupled to a free end of the load beam extension, and a gimbal coupled to the second end of the load beam and to the slider.

11 Claims, 4 Drawing Sheets

SUSPENSION DESIGN FOR ATTENUATION OF DISK FLUTTER INDUCED TRACK MIS-REGISTRATION OF A HARD DISK DRIVE BY MANIPULATION OF LOAD BEAM PITCH ANGLE

BACKGROUND OF THE INVENTION

1. Field of the Invention

The present invention relates to disk drives. More particularly, the present invention relates to disk drives, head stack assemblies and load beams that include structures that contribute to reducing disk flutter induced track mis-registration ("TMR").

2. Description of the Prior Art

A typical hard disk drive includes a head disk assembly ("HDA") and a printed circuit board assembly ("PCBA"). The HDA includes at least one magnetic disk ("disk"), a spindle 3 motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

A challenge faced by hard disk drive designers and manufacturers as they continually increase the capacities of contemporary hard disk drives is the phenomenon known as Non Repeatable Run Out ("NRRO"). NRRO, either written into the data tracks (usually denoted "RRO") or occurring live during drive operation, manifests itself as radial displacements of the read/write head(s) relative to the data tracks of the disk(s), caused by vibrations of either the HSA or disk pack (inc. spindle motor, disk(s), spacer(s), and clamp). As the storage capacity of magnetic disks increases, the number of data tracks per inch ("TPI") is increased, or conversely, the track width is decreased, leading to greater data density per unit area on the magnetic media. Since NRRO may degrade the data transfer performance to and from the magnetic media by increasing, for example, the frequency of off track errors, the ratio of RMS NRRO to track width must be maintained at a fairly constant value; thus, designers must ensure that NRRO decreases in proportion to track width. Since disk flutter (or out of plane vibrations of the disk induced by turbulent airflow within the drive) TMR is the dominant contributor to NRRO, reducing disk flutter TMR will correspondingly decrease NRRO. In turn, decreasing NRRO may enable higher TPI to be reliably achieved.

What are needed, therefore, disk drives, head stack assemblies and load beams configured to reduce disk flutter induced TMR.

SUMMARY OF THE INVENTION

This invention may be regarded as a head stack assembly for a disk drive. According to an embodiment of the present invention, the head stack assembly includes a body portion including a bore defining a pivot axis; an actuator arm cantilevered from the body portion and a head gimbal assembly supported at the actuator arm. The head gimbal assembly includes a load beam having a first end and a second end, the first end being attached to the actuator arm, the load beam defining a load beam feature near the second end, at least a portion of the load beam feature defining an extension that is parallel to the pivot axis and that has a rectangular cross-section having a length to width aspect ratio that is greater than 1. A slider is coupled to the free end of the load beam extension, and a gimbal is coupled to the second end of the load beam and to the slider. According to a further embodiment, the load beam feature may include a formed dimple and the extension may extend from the dimple.

The present invention is also a load beam assembly for attachment to an actuator arm in a disk drive, the disk drive having a disk, the load beam assembly including a load beam, the load beam defining a first end and a second end, the first end being attached to the actuator arm, the load beam defining a load beam feature near the second end, at least a portion of the load beam feature defining an extension that extends toward the disk and that has a rectangular cross-section having a length to width aspect ratio that is greater than 1. The load beam feature may include a dimple and the extension may extend from the dimple.

According to still another embodiment thereof, the present invention is also a head gimbal assembly for attachment to an actuator arm in a disk drive having a disk. The head gimbal assembly includes a load beam, the load beam defining a first end and a second end, the first end being attached to the actuator arm, the load beam defining a load beam feature near the second end, at least a portion of the load beam feature defining an extension that extends toward the disk and that has a rectangular cross-section having a length to width aspect ratio that is greater than 1. A slider is coupled to a free end of the load beam extension, and a gimbal is coupled to the second end of the load beam and to the slider. The load beam feature may include a dimple and the extension may extend from the dimple.

The present invention may also be viewed as a disk drive, including a disk having a recording surface and a head stack assembly. The head stack assembly includes a body portion; an actuator arm cantilevered from the body portion, and a head gimbal assembly supported at the actuator arm. The head gimbal assembly includes a load beam the load beam defining a first end and a second end, the first end being attached to the actuator arm, the load beam defining a load beam feature near the second end, at least a portion of the load beam feature defining an extension that extends toward the disk and that has a rectangular cross-section having a length to width aspect ratio that is greater than 1; a slider coupled to a free end of the load beam extension, and a gimbal coupled to the second end of the load beam and to the slider. The load beam feature may include a dimple and the extension may extend from the dimple.

According to another embodiment thereof, the present invention is a head stack assembly for a disk drive having a disk, the head stack assembly including a body portion; an actuator arm cantilevered from the body portion and a head gimbal assembly supported at the actuator arm. The head gimbal assembly includes a load beam having a first end and a second end, the first end being attached to the actuator arm; a gimbal coupled to the second end of the load beam; a passive spacer defining a first surface that is coupled to the gimbal and a second surface that faces away from the first surface and a slider coupled to the second surface of the passive spacer.

The first surface of the passive spacer may be separated from the second surface of the passive spacer by at least 0.02 mm. The load beam may define a dimple near the second end, the passive spacer being coupled to the dimple.

The present invention may also be viewed as a head gimbal assembly configured to be supported by an actuator arm in a disk drive, the disk drive having a disk, the head gimbal assembly including a load beam having a first end and a second end, the first end being attached to the actuator arm; a gimbal coupled to the second end of the load beam; a passive spacer defining a first surface that is coupled to the load beam and a second surface that faces away from the first surface, and a slider coupled to the second surface of the passive spacer and to the gimbal. The first surface of the passive spacer may be separated from the second surface of the passive spacer by at least 0.02 mm. The load beam may define a dimple near the second end, the gimbal being coupled to the dimple.

The present invention is also disk drive, including a disk having a recording surface and a head stack assembly. The head stack assembly includes a body portion; an actuator arm cantilevered from the body portion, and a head gimbal assembly supported at the actuator arm. The head gimbal assembly includes a load beam having a first end and a second end, the first end being attached to the actuator arm; a gimbal coupled to the second end of the load beam; a passive spacer defining a first surface that is coupled to the load beam and a second surface that faces away from the first surface, and a slider coupled to the second surface of the passive spacer and to the gimbal. The first surface of the passive spacer may be separated from the second surface of the passive spacer by at least 0.02 mm. The dimension of the passive spacer between the first surface of the passive spacer and the second surface of the passive spacer may be selected to be greater than about 0.02 mm. The load beam may define a dimple near the second end, the gimbal being coupled to the dimple.

The foregoing and other features of the invention are described in detail below and set forth in the appended claims.

DESCRIPTION OF THE PREFERRED EMBODIMENTS

Figure 6:
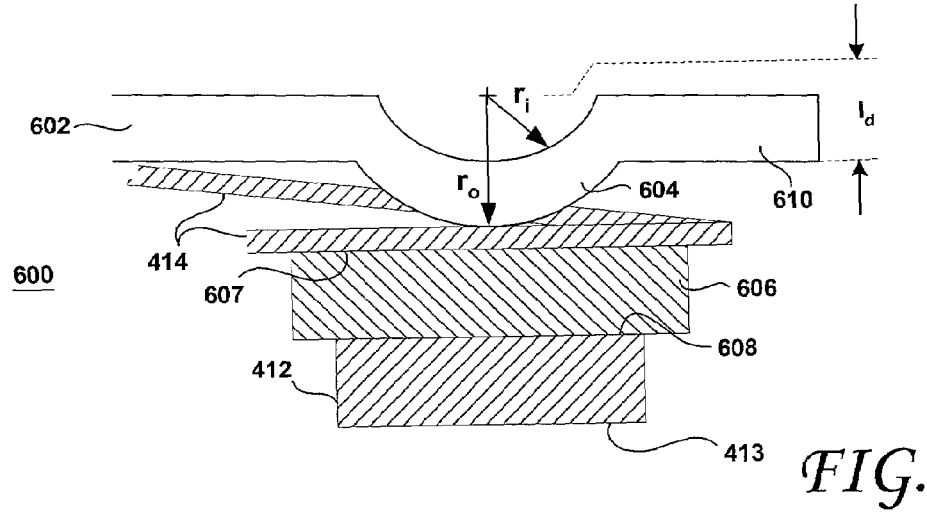
FIG. 6 is a partial side cross-sectional view of a HGA, according to a further embodiment of the present invention.
Figure 7:
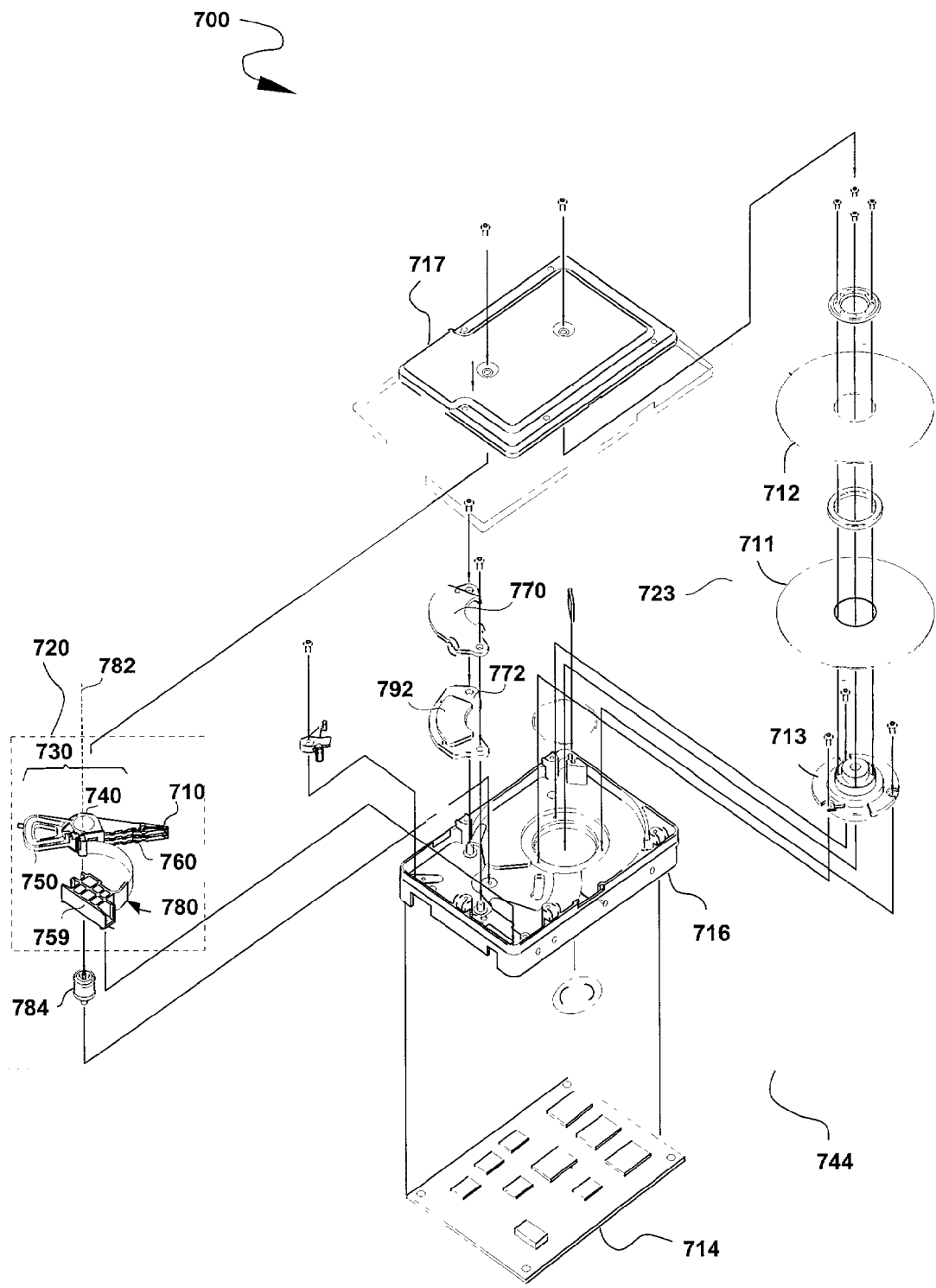
FIG. 7 is an exploded view of a hard disk drive, according to an embodiment of the present invention.

FIG. 7 shows the principal components of a magnetic disk drive 700 constructed in accordance with the present invention. With reference to FIG. 7, the disk drive 700 comprises a HDA 744 and a PCBA 714. The HDA 744 includes a base 716 and a cover 717 attached to the base 716 that collectively house a disk stack 723 that includes a plurality of magnetic disks (of which only a first disk 711 and a second disk 712 are shown in FIG. 7), a spindle motor 713 attached to the base 716 for rotating the disk stack 723, an HSA 720, and a pivot bearing cartridge 784 (such as a stainless steel pivot bearing cartridge, for example) that rotatably supports the HSA 720 on the base 716. The spindle motor 713 rotates the disk stack 723 at a constant angular velocity. The HSA 720 comprises a swing-type or rotary actuator assembly 730, at least one HGA 710, and a flex circuit cable assembly 780. The rotary actuator assembly 730 includes a body portion 740, at least one actuator arm 760 cantilevered from the body portion 740, and a coil portion 750 cantilevered from the body portion 740 in an opposite direction from the actuator arm 760. The actuator arm 760 supports the HGA 710 that, in turn, supports the slider(s) (see FIGS. 4, 5 and 6) according to the present invention. The flex cable assembly 780 may include a flex circuit cable and a flex clamp 759. The HSA 720 is pivotally secured to the base 716 via the pivot-bearing cartridge 784 so that the slider at the distal end of the HGA 710 may be moved over the surfaces of the disks 711, 712. The pivot-bearing cartridge 784 enables the HSA 720 to pivot about a pivot axis, shown in FIGS. 7 and 3 at reference numeral 782. The storage capacity of the HDA 744 may be increased by, for example, increasing the track density (the TPI) on the disks 711, 712 and/or by including additional disks in the disk stack 723 and by an HSA 720 having a vertical stack of HGAs 710 supported by multiple actuator arms 760.

The "rotary" or "swing-type" actuator assembly comprises a body portion 740 that rotates on the pivot bearing 784 cartridge between limited positions, a coil portion 750 that extends from one side of the body portion 740 to interact with one or more permanent magnets 792 mounted to back irons 770, 772 to form a voice coil motor (VCM), and an actuator arm 760 that extends from an opposite side of the body portion 740 to support the HGA 710. The VCM causes the HSA 720 to pivot about the actuator pivot axis 782 to cause the slider and the read write transducers thereof to sweep radially over the disk(s) 711, 712. The HGA 710 includes a load beam and a gimbal coupled to the load beam, as detailed below.

Figure 3:
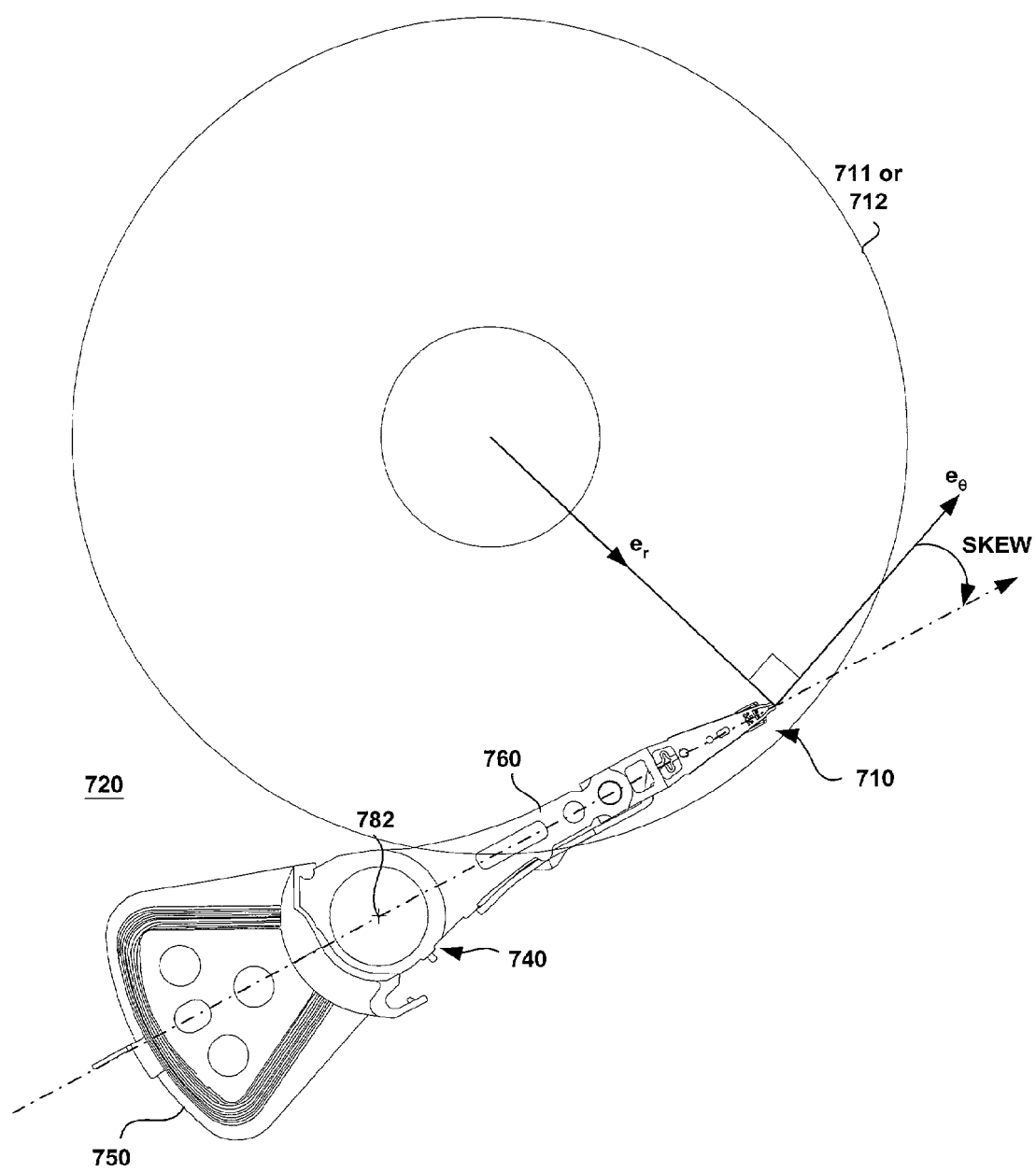
FIG. 3 is a plan view of a disk and an HSA, according to an embodiment of the present invention.
Figure 4:
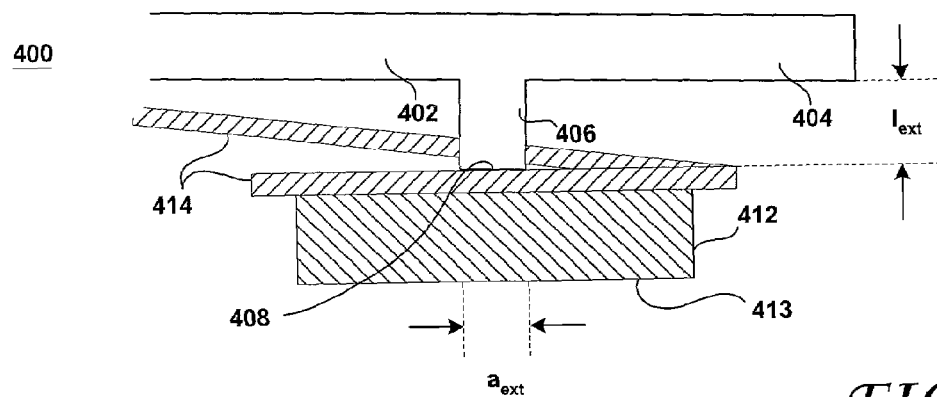
FIG. 4 is a partial side cross-sectional view of a HGA, according to an embodiment of the present invention.
Figure 5:
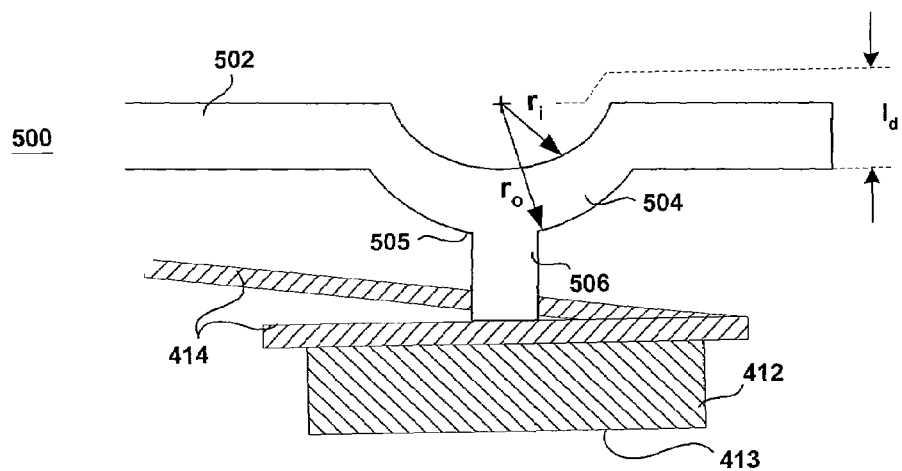
FIG. 5 is a partial side cross-sectional view of a HGA, according to another embodiment of the present invention.

FIG. 3 is a plan view of a disk 711, 712 and a head stack assembly 720, according to an embodiment of the present invention. As shown therein, the skew angle is defined as the angle of the slider (best shown at 412 in FIGS. 4, 5 and 6) relative to a tangent to the data tracks recorded on the recording surface of the disk 711, 712. With reference to FIG. 3, the skew angle is shown as the angle formed between the longitudinal axis 310 of the head stack assembly 720 passing through the slider and the data track tangent 320. The data track tangent is parallel to the tangential direction $e_\theta$ that is at a 90-degree angle relative to the radial direction er. As defined herein and shown in FIG. 3, the skew angle is positive in the clockwise direction. The head stack assembly 720 of FIG. 3 may include one or more of the structures that are shown in FIGS. 4, 5 and 6 (and/or combinations and variants thereof) and that are described herein below.

Total disk flutter TMR, which is the radial position error between the read/write transducer heads and the data track of a hard disk drive due to disk vibrations, is the summation (in the time domain) of four components; namely, disk deformation, suspension pitching, and slider pitching and rolling. That is, $$TMR_{total}=TMR_{pitch}+TMR_{roll}+TMR_{disk}+TMR_{suspension} \quad (1)$$

Figure 1:
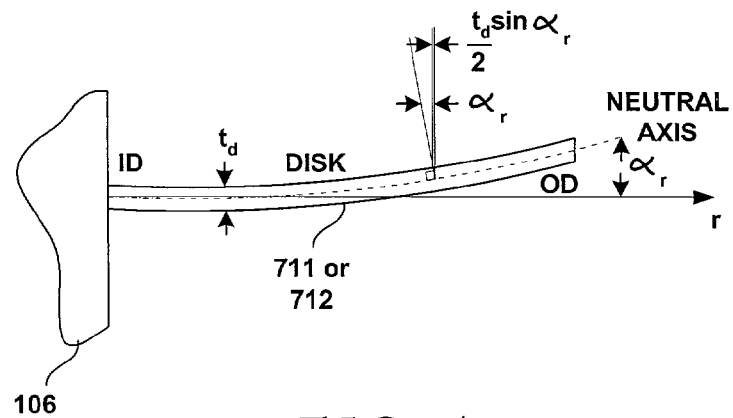
FIG. 1 depicts the geometry of a disk of a hard disk drive.

FIG. 1 depicts the geometry of a disk 711 or 712 of a hard disk drive, such as shown at 700 in FIG. 7. The disk 711, 712 is clamped at the inner diameter (ID) thereof at clamp 106 and free at the outer diameter (OD) thereof. In FIG. 1, $\alpha_r$ is the angular orientation of the disk 711, 712 in the radial direction and $t_d$ is the thickness of the disk 711 or 712. As shown the disk 711 or 712 may undergo deformation, causing the neutral axis of the disk 711, 712 to deviate relative to the radial direction r by an angle $\alpha_s$.

Figure 2:
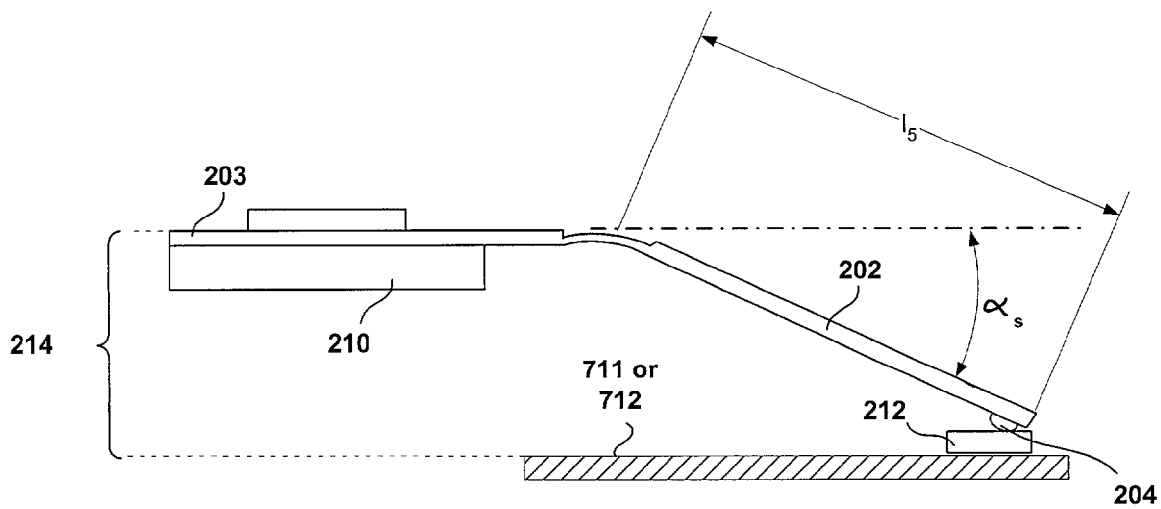
FIG. 2 shows a side view of a head gimbal assembly (HGA) in which the pitch angle $\alpha_s$ is identified.

FIG. 2 shows a side view of a head gimbal assembly (HGA) to illustrate the pitch angle $\alpha_s$. In FIG. 2, the pitch angle as is measured from the plane of the mount plate 210, or other suspension mounting surface of/to the actuator arm, to the load beam. The pitch angle $\alpha_s$ is positive as shown in FIG. 2.

As shown in FIGS. 1 and 2 the disk and suspension TMR is modeled herein as $$TMR_{disk} = \frac{t_d}{2}\sin(\alpha_r) \text{ and} \quad (2)$$

$$TMR_{suspension} = \sin(skew)l_5\left[\cos\left(\sin^{-1}\left(\frac{l_5\sin(\alpha_s)-z}{l_5}\right)\right)-\cos(\alpha_s)\right] \quad (3)$$

(See FIGS. 1, 2)

Restricting the r-dependence of z to monotonically increasing or decreasing, or zero-valued, functions (only modes of practical importance are considered, i.e. those with zero nodal circles) of r, then $$[\{z>0\}\Longleftrightarrow\{\alpha_r>0\}, \quad \{z=0\}\Longleftrightarrow\{\alpha_r=0\}, \quad \{z<0\}$$
$$\Longleftrightarrow\{\alpha_r<0\}], \quad (4)$$

for an arbitrary instant in time and angular location on the disk.

From Equation (2), it may be shown that minimizing $|\alpha_s|$ will minimize $TMR_{suspension}$ (regardless of skew angle), and therefore may reduce the total disk flutter induced TMR. Furthermore, if $\alpha_s<0$, it may be proved from equations (1)–(4) that $TMR_{suspension}$ and $TMR_{disk}$ are perfectly out-of-phase at negative skew angles (disk OD, where worst total disk flutter TMR typically occurs), and therefore at least partial cancellation of terms occurs, further reducing the total disk flutter TMR. Although there are four components that contribute to disk flutter TMR, only the suspension component is a function of $\alpha_s$; therefore, although the present invention only considers cancellation of disk and suspension TMR, the present invention may be extended to cover cancellation between the portions of slider pitch and roll TMR that are in-phase with disk TMR, i.e. the total disk flutter TMR may be considered solely as it varies with $\alpha_s$, without loss of generality.

The present invention includes a number of embodiments for mitigating the deleterious effects of disk flutter induced TMR by reducing the pitch angle $\alpha_s$ (including negative values), which embodiments are described below and shown in the accompanying figures. It may be shown that disk flutter TMR has a minimum for sufficiently negative values of $\alpha_s$, when the actuator is positioned to OD, although geometrical considerations may limit the range of $\alpha_s$. In particular, since only the suspension TMR is a function of $\alpha_s$, this minimum corresponds to complete cancellation by the suspension TMR of the portions of disk, slider pitch, and slider roll TMR that are 180° out-of-phase with respect to the suspension TMR.

As collectively shown by FIGS. 4 and 7, the present invention, according to one embodiment thereof, is a disk drive 700 that includes a disk 711, 712 having a recording surface and a HSA 720. The HSA 720 includes a body portion, an actuator arm cantilevered from the body portion 740, and a HGA 710 supported at the actuator arm 760.

As shown in FIG. 4, the HGA 400 includes a load beam 402 that defines a first end (not shown in FIG. 4) attached to the actuator arm 760 and a second end 404, which is the free end thereof. The load beam 402 defines a load beam feature near the second (slider) end 404. According to one embodiment of the present invention, the load beam feature (or at least a portion thereof) may define an extension 406 that extends toward the disk 711, 712 (i.e., parallel or substantially parallel to the pivot axis 782) and that has a rectangular cross-section having an extraordinary length to width aspect ratio; that is, the rectangular cross section of the load beam extension 406 has a length to width aspect ratio $1_{ext}/a_{ext}$ that is greater than 1. For example, the aspect ration $1_{ext}/a_{ext}$ may be selected within the range of 1 to 10, although other dimensions may readily be implemented, subject to the constraints of available space between the top of the hinge 203 in FIG. 2 and the disk 711, 712. This space is shown in FIG. 2 at reference numeral 214. Advantageously, the load beam extension 406 may be etched from the load beam 402. As shown in FIG. 4, a slider 412 may be coupled to the free end 408 of the load beam extension 406. The read/write transducer(s) (not shown) may be attached to or form part of the slider 412. A gimbal 414 is coupled to the second end 404 of the load beam 402 and to the slider 412. As the extraordinary aspect ratio $1_{ext}/a_{ext}>1$ of the load beam extension 406 raises the slider end 404 of the load beam (pictured in FIG. 4) relative to the disk 711, 712 (not shown in FIG. 4, but which faces the free end of slider 413), the angle $\alpha_s$ is minimized. In turn, minimizing $\alpha_s$ decreases TMR at the disk OD, as shown above.

According to another embodiment of the present invention shown in FIG. 5, showing a portion of a HGA 500 shown in cross-section in FIG. 5, the load beam feature includes a dimple 504 and an extension 506 extends from the dimple 504. Advantageously, the dimple 504 may be formed within the load beam 502 and the extension 506 may be etched from the load beam 502 and, specifically from the dimple 504. The rectangular cross section of the extension 506 may have a length to width aspect ratio $1_{ext}/a_{ext}$ that is greater than 1. For example, the aspect ration $1_{ext}/a_{ext}$ may be selected within the range of 1 to 10, although other dimensions may readily be implemented subject to the constraints of available space 214 (FIG. 2). As the combination of the dimple 504 and the extraordinary aspect ratio $1_{ext}/a_{ext}>1$ of the extension 506 raises the slider end of the load beam 502 relative to the disk 711, 712 (not shown in FIG. 5, but which faces the free end 413 of slider 412), the angle $\alpha_s$ is minimized. In turn, minimizing $\alpha_s$ decreases TMR at the disk OD, as discussed above. The feature of the load beam 502 may include a dimple 504 of extraordinarily large outer radius $r_o$, and/or extraordinarily small vertical positional dimension $1_d(=r_i)$, such that the outer spherical surface 505 of the dimple 504 extends extraordinarily low (i.e., toward the disk 711, 712), thereby raising the slider end of the load beam 502 relative to the disk 711, 712.

Another embodiment of the present invention is shown in FIG. 6, which is a side cross-sectional partial view of a HGA 600. The HGA 600 of FIG. 6 is supported at the actuator arm 760 and includes a load beam 602 having a first end attached to the actuator arm and a second (slider) end. A gimbal 414 is coupled to the second end of the load beam 602 and a passive spacer 606 is coupled to the gimbal 606. Specifically, the spacer 606 defines a first surface 607 that is coupled to the gimbal 414 and a second surface 608 that faces away from the first surface 607, the slider 412 being coupled to the second surface 608. Preferably, the spacer 412 is entirely passive and, according to the present invention, serves no function (such as would be discharged by a micro electromechanical system "MEMS" or a piezoelectric "PZT" motor for controllably changing the orientation and position of the slider 412, for example) other than raising the second (slider) end 610 of the load beam 602 relative to the disk 711, 712 (not shown in FIG. 6, but which faces the free surface 413 of the slider 412). By raising the slider end 610 of the load beam 602 relative to the disk 711, 712, the angle $\alpha_s$ is minimized. In turn, minimizing $\alpha_s$ decreases TMR at the disk OD, as detailed above. According to an embodiment of the present invention, the width of the passive spacer 606 (in a direction parallel to the pivot axis 782) is at least 0.02 mm. That is, the first surface 607 of the passive spacer 606 is separated from the second surface 608 thereof by at least 0.02 mm.

As shown in FIG. 6, the HGA 600 includes a load beam 606 that defines a (formed, for example) dimple 604 near the second (slider) end 610 of the load beam 602. Moreover, although not shown in FIG. 6, an extension similar to that shown in FIG. 5 at 506 may extend from the dimple 604, to further raise the second (slider) end of the load beam 602 relative to the disk 711, 712, while respecting the constraints imposed upon such structures by the inherent limitation in space between the mounting structure of the load beam 602 (see reference numeral 214 in FIG. 2) and the disk 711, 712. Instead of the dimple 604, the load beam 602 may include a feature including (optionally, only) an extension of rectangular cross-section, as shown at 406 in FIG. 4. Other structures and/or combinations of structures and methods of manufacturing the same to raise the second (slider) end 610 of the load beam 602 to minimize the angle $\alpha_s$ will occur to those of skill in this art and all such structures are deemed to fall within the scope and spirit of the present invention.

The load beam features shown in FIGS. 4, 5 and 6 (and/or various combinations and variants thereof) may be incorporated in the HGA 710 of FIG. 7 to achieve a disk drive according to the present invention. Advantageously, the present invention, by reducing disk flutter induced TMR and consequently NRRO, enables the TPI of the disks 711, 712 to be increased, thereby enabling the capacity of the drive 700 to be correspondingly increased.

What is claimed is:

1. A head stack assembly for a disk drive, the head stack assembly comprising:
a body portion including a bore defining a pivot axis;
an actuator arm cantilevered from the body portion;
a head gimbal assembly supported at the actuator arm and including:
a load beam having a first end and a second end, the first end being attached to the actuator arm, the load beam defining a load beam feature near the second end, at least a portion of the load beam feature defining a formed dimple and an extension that extends from the formed dimple, the extension being parallel to the pivot axis and having a rectangular cross-section that has a length to width aspect ratio that is greater than 1;
a slider coupled to a free end of the load beam extension, and
a gimbal coupled to the second end of the load beam and to the slider.

2. A load beam assembly for attachment to an actuator arm in a disk drive, the disk drive having a disk, the load beam assembly comprising:
a load beam, the load beam defining a first end and a second end, the first end being attached to the actuator arm, the load beam defining a load beam feature near the second end, at least a portion of the load beam feature defining a dimple and an extension that extends from the dimple toward the disk, the extension having a rectangular cross-section having a length to width aspect ratio that is greater than 1.

3. A head gimbal assembly for attachment to an actuator arm in a disk drive, the disk drive having a disk, the head gimbal assembly comprising:
a load beam, the load beam defining a first end and a second end, the first end being attached to the actuator arm, the load beam defining a load beam feature near the second end, at least a portion of the load beam feature defining a dimple and an extension that extends from the dimple toward the disk, the extension having a rectangular cross-section having a length to width aspect ratio that is greater than 1;
a slider coupled to a free end of the load beam extension; and
a gimbal coupled to the second end of the load beam and to the slider.

4. A disk drive, comprising:
a disk having a recording surface;
a head stack assembly, including:
a body portion;
an actuator, arm cantilevered from the body portion, and a head gimbal assembly supported at the actuator arm and including:
a load beam, the load beam defining a first end and a second end, the first end being attached to the actuator arm, the load beam defining a load beam feature near the second end, at least a portion of the load beam feature defining a dimple and an extension that extends from the dimple toward the disk, the extension having a rectangular cross-section having a length to width aspect ratio that is greater than 1;
a slider coupled to a free end of the load beam extension; and
a gimbal coupled to the second end of the load beam and to the slider.

5. A head stack assembly for a disk drive having a disk, the head stack assembly comprising:
a body portion;
an actuator arm cantilevered from the body portion;
a head gimbal assembly supported at the actuator arm and including:
a load beam having a first end and a second end, the first end being attached to the actuator arm;
a gimbal coupled to the, second end of the load beam;

a passive spacer defining a first surface that is coupled to the gimbal and a second surface that faces away from the first surface, the first surface of the passive spacer being separated from the second surface of the passive spacer by at least 0.02 mm; and a slider coupled to the second surface of the passive spacer.

6. The head stack assembly of claim 5, wherein the load beam defines a dimple near the second end, the passive spacer being coupled to the dimple.

7. A head gimbal assembly configured to be supported by an actuator arm in a disk drive, the disk drive having a disk, the head gimbal assembly comprising:

a load beam having a first end and a second end, the first end being attached to the actuator arm;

a gimbal coupled to the second end of the load beam;

a passive spacer defining a first surface that is coupled to the load beam and a second surface that faces away from the first surface, the first surface of the passive spacer being separated from the second surface of the passive spacer by at least 0.02 mm; and a slider coupled to the second surface of the passive spacer and to the gimbal.

8. The head gimbal assembly of claim 7, wherein the load beam defines a dimple near the second end, the gimbal being coupled to the dimple.

9. A disk drive, comprising:

a disk having a recording surface;

a head stack assembly, including:

a body portion;

an actuator arm cantilevered from the body portion; and a head gimbal assembly supported at the actuator arm and including:

a load beam having a first end and a second end, the first end being attached to the actuator arm;

a gimbal coupled to the second end of the load beam;

a passive spacer defining a first surface that is coupled to the load beam and a second surface that faces away from the first surface, the first surface of the passive spacer being separated from the second surface of the passive spacer by at least 0.02 mm, and a slider coupled to the second surface of the passive spacer and to the gimbal.

10. The disk drive of claim 9, wherein a dimension of the passive spacer between the first surface of the passive spacer and the second surface of the passive spacer is selected to be greater than about 0.02 mm.

11. The disk drive of claim 9, wherein the load beam defines a dimple near the second end, te gimbal being coupled to the dimple.

* * * * *